(12) United States Patent
Dubsky et al.

(10) Patent No.: US 9,832,067 B2
(45) Date of Patent: Nov. 28, 2017

(54) NETWORK TOOL SYNCHRONIZATION

(71) Applicant: Hewlett-Packard Development Company, L.P., Houston, TX (US)

(72) Inventors: Vladimir Dubsky, Podebrady (CZ); Miroslav Malecha, Prague (CZ); Slavomir Opler, Prague (CZ)

(73) Assignee: EntIT Software LLC, Sunnyvale, CA (US)

( * ) Notice: Subject to any disclaimer, the term of this patent is extended or adjusted under 35 U.S.C. 154(b) by 449 days.

(21) Appl. No.: 14/266,471

(22) Filed: Apr. 30, 2014

(65) Prior Publication Data
US 2015/0319220 A1    Nov. 5, 2015

(51) Int. Cl.
*H04L 29/08* (2006.01)
*H04L 12/24* (2006.01)

(52) U.S. Cl.
CPC .............. *H04L 29/08* (2013.01); *H04L 41/00* (2013.01); *H04L 67/10* (2013.01); *H04L 67/1097* (2013.01)

(58) Field of Classification Search
CPC ...................................... H04L 67/10
USPC ........................................ 709/204
See application file for complete search history.

(56) References Cited

U.S. PATENT DOCUMENTS

| | | | |
|---|---|---|---|
| 2011/0035229 A1 | 2/2011 | Colombo et al. | |
| 2011/0191383 A1* | 8/2011 | Addala .................. | G06F 17/30 707/797 |
| 2012/0265324 A1 | 10/2012 | Colombo et al. | |
| 2013/0232498 A1* | 9/2013 | Mangtani .............. | G06F 9/5072 718/104 |
| 2015/0006878 A1* | 1/2015 | Kumar ................... | G06F 8/355 713/100 |

FOREIGN PATENT DOCUMENTS

CN          102902536          1/2013

OTHER PUBLICATIONS

C. Lehmann, 2014 Research Agenda: Hybrid Integration, Process Management and Enterprise Architecture, Jan. 10, 2014, 10 pages.
Wennovate, Enterprise Architecture, http://www.wennovatetech.com/?page_id=66, 2 pages.
Tom Nolle, Developing Business Process Execution Language Composite Apps, Aug. 8, 2013, 13 pages.
Jan Stafford, Using Enterprise Architecture (EA) and SOA to Bridge Business and IT, TOG Conference, 2012, 13 pages.

* cited by examiner

*Primary Examiner* — Suraj Joshi

(57) ABSTRACT

In one implementation, a system for network tool synchronization includes a methodology engine to receive a data methodology of an enterprise architecture tool from the enterprise architecture tool. In addition, the system includes a functionality engine to analyze deployment diagrams of an orchestration tool to determine a functionality of the orchestration tool. In addition, the system includes an architecture engine to select information from the enterprise architecture tool based on the functionality of the orchestration tool. In addition, the system includes an information engine to export the selected information to the orchestration tool.

21 Claims, 3 Drawing Sheets

NETWORK TOOL SYNCHRONIZATION

BACKGROUND

A cloud computing network can utilize a variety of network tools for automated deployment, arrangement, coordination, and/or management of computer systems, middleware, and/or services from the cloud computing network. The network tools can receive and/or gather information that relates to the cloud computing network. The network tools can utilize information that relates to the cloud computing network to provide additional services to the cloud computing network and/or provide data to a user.

DETAILED DESCRIPTION

Figure 1:
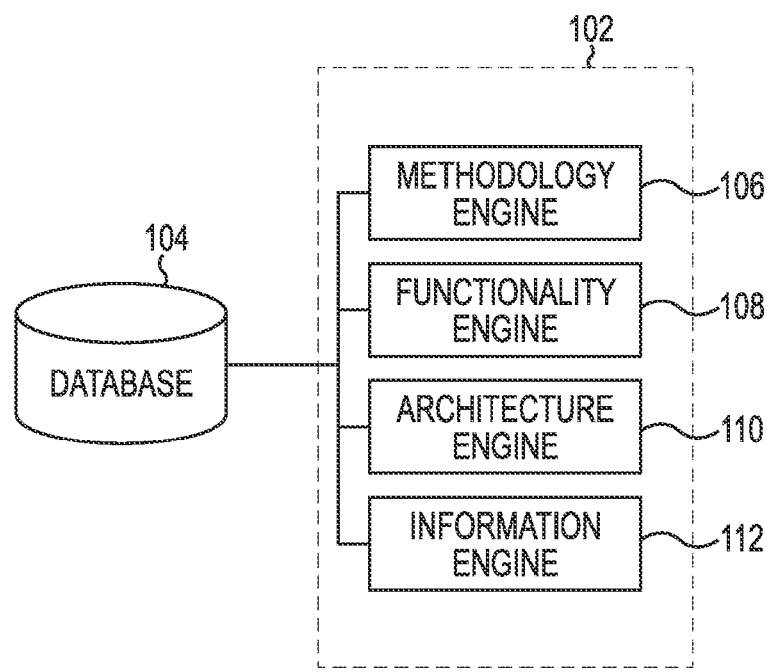
FIG. 1 illustrates a diagram of an example of a system for network tool synchronization according to the present disclosure.

A cloud computing network can utilize a plurality of tools that can be used to automate deployment, arrangement, coordination, and/or management of computer systems, middleware, and services of the cloud computing network. The plurality of tools can include orchestration tools. As used herein, the orchestration tools are capable of deploying and/or managing a plurality of applications. Some examples of orchestration tools can include, but are not limited to: Chef, Juju, HP continuous delivery automation (CDA), HP orchestration operation (OO). The plurality of applications can each provide a plurality of services that span over a plurality of servers based on a configuration. The configuration can be formulated utilizing scripts and/or deployment diagrams. As used herein, the deployment diagrams define parameters (e.g., rules, architecture descriptions, performance, etc.) for each of the plurality of applications. The scripts and/or deployment diagrams can be stored and/or organized into catalogs.

The plurality of tools can also include enterprise architecture (EA) tools. As used herein, the EA tools collect and/or model information that relates to business transactions, applications that perform the business transactions and/or hardware and technology that execute the applications. Some examples of EA tools can include, but are not limited to: IBM System Architect, Sparx Enterprise Architect. The EA tool can organize the information via a data methodology. As used herein, the data methodology includes information relating to business functions with information relating to application functions that support the business functions and with information relating to application components that implement the application functions. In this example, the data methodology can be a tree like representation that can represent the business functions on a first level, the application functions on a second level, and the application components on a third level.

The information that is stored in the catalogs for the orchestration tool can be implemented by different users. The information that is included by the different users can correspond to a particular perspective of the user. In this case, there can be information included within the catalogs that may not be included or information may be included that is not relevant to a particular user. In some embodiments, it can be beneficial to export the information that is collected and/or modeled by the EA tool to the catalog of the orchestration tool. The information that is collected and/or modeled by the EA tool can be more complete and precise compared to the information included in the catalogs of the orchestration tools. In addition, it can be beneficial to export information from the EA tool to the orchestration tool based on a functionality of the orchestration tool. For example, it can be beneficial to include only information that relates to the functionality of the orchestration tool in order to save memory space and to not have additional information included in the catalogs that is not necessarily relevant to the operation and/or function of the orchestration tool.

The exporting of information from the EA tool to the orchestration tool, as well as exporting collected information from the orchestration tool to the EA tool can be considered a synchronization of the EA tool and the orchestration tool. The network tool synchronization as described herein can enable report generation, evaluation of tools and/or applications, as well as other benefits as a result of including a more complete set of information within the catalogs of the orchestration tool.

Figure 2:
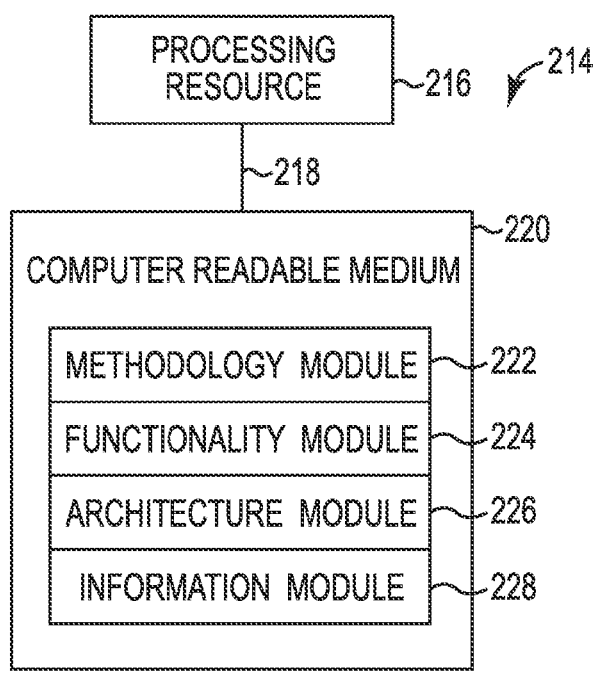
FIG. 2 illustrates a diagram of an example computing device according to the present disclosure.

FIGS. 1 and 2 illustrate examples of system 100 and computing device 214 according to the present disclosure. FIG. 1 illustrates a diagram of an example of a system 100 for network tool synchronization according to the present disclosure. The system 100 can include a database 104, a network tool synchronization system 102, and/or a number of engines (e.g., methodology engine 106, functionality engine 108, architecture engine 110, information engine 112). The network tool synchronization system 102 can be in communication with the database 104 via a communication link, and can include the number of engines (e.g., methodology engine 106, functionality engine 108, architecture engine 110, information engine 112). The network tool synchronization system 102 can include additional or fewer engines that are illustrated to perform the various functions as will be described in further detail in connection with FIG. 3.

The number of engines (e.g., methodology engine 106, functionality engine 108, architecture engine 110, information engine 112) can include a combination of hardware and programming, but at least hardware, that is configured to perform functions described herein (e.g., determine a data methodology of an enterprise architecture tool, determine a functionality of an orchestration tool, select information from the enterprise architecture tool based on the functionality of the orchestration tool, export the selected information to the orchestration tool, etc.). The programming can include program instructions (e.g., software, firmware, etc.) stored in a memory resource (e.g., computer readable medium, machine readable medium, etc.) as well as hardwired program (e.g., logic).

The methodology engine 106 can include hardware and/or a combination of hardware and programming, but at least hardware, to receive a data methodology of an enterprise architecture tool from the enterprise architecture tool. As used herein, the data methodology of the enterprise architecture tool is a tree like representation that represents relationships between features (e.g., business processes, applications, hardware, etc.) of a system. The data methodology can include a business model and/or representation of data relating to a plurality of business transactions (e.g., buying, selling, acquiring information, dispensing information, providing services, obtaining services, etc.). For example, a business can perform or be a part of transactions that include utilizing applications (e.g., software applications, etc.). In this example, the data methodology can be a representation of how a business organizes the information relating to the business transactions and/or the information relating to the number of applications.

The functionality engine 108 can include hardware and/or a combination of hardware and programming, but at least hardware, to analyze deployment diagrams of an orchestration tool to determine a functionality of the orchestration tool. As used herein, the functionality of the orchestration tool includes various features and/or functions performed by the orchestration tool. For example, the orchestration tool can be utilized for a particular business transaction, including applications to perform the particular business transaction, and/or include hardware to run the applications. Determining the functionality of the orchestration tool can also include determining catalog information from the orchestration tool. As described further herein, the functionality of the orchestration tool can be utilized to determine what information is more likely to be relevant (e.g., useful) to export to the orchestration tool. In some embodiments, determining the catalog information from the orchestration tool can be helpful to determine what information is more likely to be useful to export to the orchestration tool.

The architecture engine 110 can include hardware and/or a combination of hardware and programming, but at least hardware, to select information from the enterprise architecture tool based on the functionality of the orchestration tool. Selecting information from the enterprise architecture tool can include utilizing the information that was determined utilizing the functionality engine 108. In some embodiments, the information that is selected can be based on the functionality of the orchestration tool because the functionality of the orchestration tool can correspond to information that may be utilized by the orchestration tool and/or a user of the orchestration tool.

The information engine 112 can include hardware and/or a combination of hardware and programming, but at least hardware, to export the selected information to the orchestration tool. In some embodiments, the selected information can comprise information in the form of the data methodology of the enterprise architecture tool. That is, the selected information can include the same and/or similar data methodology as the enterprise architecture tool.

FIG. 2 illustrates a diagram of an example computing device 214 according to the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., receive a data methodology of an enterprise architecture tool within a system, wherein the data methodology includes a structural representation of data that relates to the system, select information from the enterprise architecture tool based on a functionality of the orchestration tool, wherein the functionality relates to information within a number of levels of the data methodology, export the selected information to the orchestration tool, wherein the information comprises the data methodology of the enterprise architecture tool, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., methodology module 222, functionality module 224, architecture module 226, information module 228) can include CRI that when executed by the processing resource 216 can perform functions. The number of modules (e.g., methodology module 222, functionality module 224, architecture module 226, information module 228) can be sub-modules of other modules. For example, the functionality module 224 and the architecture module 226 can be sub-modules and/or contained within the same computing device. In another example, the number of modules (e.g., methodology module 222, functionality module 224, architecture module 226, information module 228) can comprise individual modules at separate and distinct locations (e.g., CRM, etc.).

Each of the number of modules (e.g., methodology module 222, functionality module 224, architecture module 226, information module 228) can include instructions that when executed by the processing resource 216 can function as a corresponding engine as described herein. For example, the methodology module 222 can include instructions that when executed by the processing resource 216 can function as the methodology engine 106. In another example, the functionality module 224 can include instructions that when executed by the processing resource 216 can function as the functionality engine 108. In another example, the architecture module 226 can include instructions that when executed by the processing resource 216 can function as the architecture engine 110. In another example, the information module 228 can include instructions that when executed by the processing resource 216 can function as the information engine 112.

Figure 3:
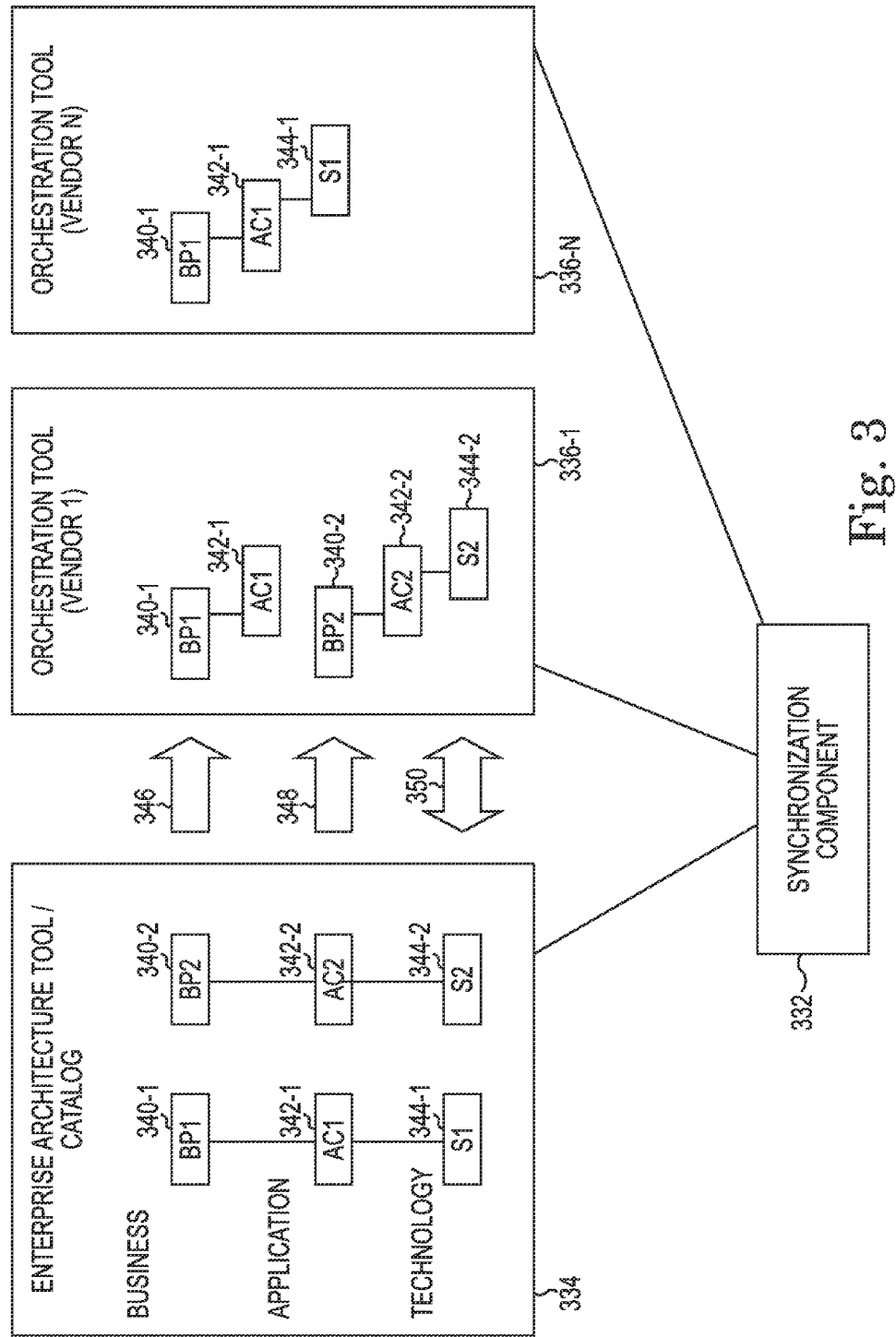
FIG. 3 illustrates an architecture for network tool synchronization according to the present disclosure.

FIG. 3 illustrates an architecture 330 for network tool synchronization according to the present disclosure. The architecture 330 includes an enterprise architecture (EA) tool 334, orchestration tools 336-1, 336-N, and a synchronization component 332. The architecture 330 is one example for network tool synchronization according to the present disclosure. More specifically, the architecture 330 is one example for synchronization of an EA tool 334 and orchestration tools 336-1, 336-N.

The EA tool 334 can include a catalog of information that is organized utilizing a data methodology. The data methodology can include a representation and/or organization of data. In some embodiments, the EA tool 334 can include a data methodology that includes a tree like representation that includes a business level, an application level, and a technology level. Each level can include nodes (e.g., data elements, etc.) that relates to a particular topic. That is, each level of the data methodology can relate to a particular topic (e.g., business process, business method, application, application type, technology, hardware, etc.) that corresponds to a particular level. In addition, nodes at a first level can be connected to nodes at a second level based on a relationship between the nodes at the first level and the nodes at the second level.

The business level can be a level of the data methodology that includes information relating to transactions (e.g., business transactions, processes, business processes, etc.). The business level can include information relating to overall goals for business processes and/or information relating to a type of transaction. That is, the business level can be a level of the data methodology that includes information that relates to various business functions.

The application level can be a level of the data methodology that includes information relating to applications (e.g., software applications, etc.) that perform the various business functions. In some embodiments, the application level can be a lower level than the business level when the data methodology is represented as a tree-like structure. In some embodiments, the application level can include nodes that are connected to nodes of the business level. For example, an application node 342-1 can be connected to a business node 340-1. In this example, the application node 342-1 can include information about various applications that perform and/or assist in the performance of business functions that are described within the business node 340-1.

The technology level can be a level of the data methodology that includes information relating to technology (e.g., hardware, computing devices, networking devices, processing resources, etc.) that executes an application from the application layer that performs a business function from the business layer. For example, a technology node 344-2 can include information that relates to servers that execute applications that are described via information in application node 342-2. In this example, the information in application node 342-2 can relate to business processes that are described in business node 340-2.

A synchronization component 332 can be utilized to determine the data methodology of the EA tool 334. The synchronization component 332 can include a number of engines (e.g., methodology engine 106, functionality engine 108, architecture engine 110, and/or information engine 112 as referenced in FIG. 1, etc.) and/or a number of modules (e.g., methodology module 222, functionality module 224, architecture module 226, information module 228 as referenced in FIG. 2, etc.) to perform functions. The synchronization component 332 can be utilized to determine data within the data methodology of the EA tool 334. For example, the synchronization component 332 can determine the data methodology of the EA tool 334 and determine various types of data within each level of the data methodology.

The synchronization component 332 can be utilized to determine types of data that can correspond to particular functionality. For example, the synchronization component 332 can utilize the information within the data methodology of the EA tool 334 to determine what data within the EA tool corresponds to particular functions that can be executed by the orchestration tools 336-1, 336-N. For example, the orchestration tool 336-1 can have a particular functionality that includes performing transactions. In this example, the synchronization component 332 can determine the particular functionality of the orchestration tool 336-1 and determine what information within the EA tool 334 relates to the particular functionality. In this example, the synchronization component 332 can export the information from the EA tool 334 that relates to the particular functionality of the orchestration tool 336-1.

The synchronization component 332 can be utilized to determine what information within the EA tool 334 relates to a functionality at each level of the data methodology within the EA tool 334. That is, the synchronization component 332 can export information from the business level, information from the application level, and/or information from the technology level based on a functionality of each orchestration tool 336-1, 336-N.

The synchronization component 332 can export information from the business level of the data methodology to orchestration tools 336-1, 336-N based on the functionality of each of the orchestration tools 336-1, 336-N. For example, the synchronization component 332 can determine what information on the business level (e.g., business node 340-1, business node 340-2, etc.) of the EA tool 334 relates to a functionality of the orchestration tool 336-1. In this example, the business node 340-1 and the business node 340-2 can both relate to the functionality of the orchestration tool 336-1 and can be exported via pathway 346. In another example, the business node 340-1 can be the only business node that is exported to orchestration tool 336-N.

The synchronization component 332 can export information from the application level of the data methodology to orchestration tools 336-1, 336-N via pathway 348 based on the functionality of each of the orchestration tools 336-1, 336-N. In addition, the synchronization component 332 can export information from the technology level of the data methodology to orchestration tools 336-1, 336-N via pathway 350 based on the functionality of each of the orchestration tools 336-1, 336-N. In some embodiments, only a portion of the data methodology is exported to a particular orchestration tool 336-1, 336-N. For example, the data methodology that includes a business node 340-1, an application node 342-1, and a technology node 344-1 can be exported as a portion of the data methodology to orchestration tool 336-1. In this example, only the portion of the data methodology that includes the business node 340-1 and the application node 342-1 are exported to the orchestration tool 336-1.

The information that is exported by the synchronization component 332 can be exported in the data methodology of the EA tool 334. That is, the information that is exported to each of the orchestration tools 336-1, 336-N can be represented by the same data methodology as the data methodology of the EA tool 334. For example, the data methodology of each of the orchestration tools 336-1, 336-N can be a tree like representation that includes a business level on a first level, an application level on a second level, and/or a technology level on a third level. As described herein, each level of the data methodology can include nodes that represent information that corresponds to each level. For example, the technology level can include nodes that include information relating to hardware and/or computing devices.

In some embodiments, the synchronization component 332 can export information to the EA tool 334 via pathway 350 that is received by each of the orchestration tools 336-1, 336-N. The information received the orchestration tools 336-1, 336-N can be information relating to hardware and/or computing devices in the technology level of the data methodology. The information relating to the hardware and/or computing devices in the technology level can be beneficial for the EA tool 334. The EA tool 334 can add the received information from the orchestration tools 336-1, 336-N to the data methodology. In some embodiments, the received information can be added to the technology level of the data methodology.

Synchronization of the EA tool 334 and the orchestration tools 336-1, 336-N can provide more complete information within a catalog of each of the orchestration tools 336-1, 336-N. The information that is exported to each of the orchestration tools 336-1, 336-N can increase efficiency of each of the orchestration tools 336-1, 336-N when the orchestration tools 336-1, 336-N utilize the information exported from the EA tool 334. In addition, the information that is exported to each of the orchestration tools 336-1, 336-N can increase a quantity and/or quality of data within the catalog of the orchestration tools 336-1, 336-N, which can be beneficial for users and/or developers that utilize the orchestration tools 336-1, 336-N.

Figure 4:
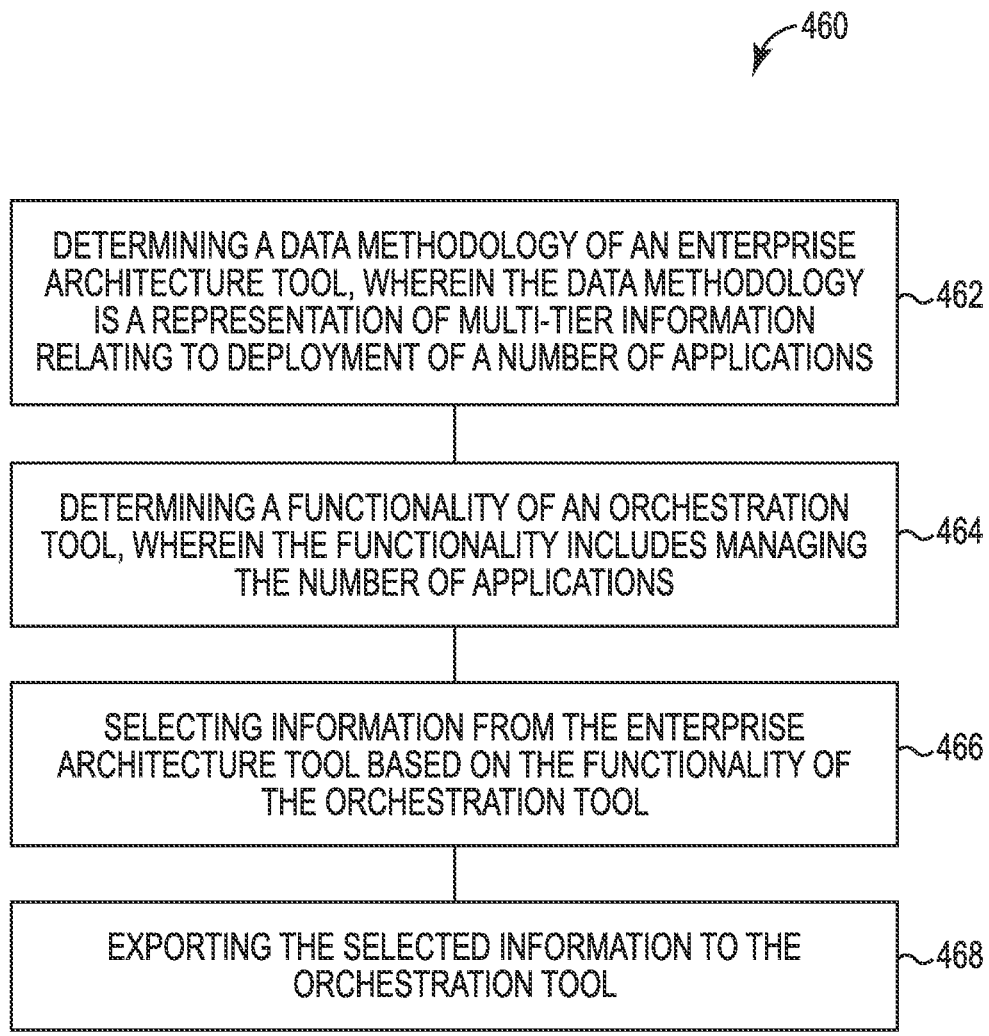
FIG. 4 is a flow chart of an example of a method for network tool synchronization according to the present disclosure.

FIG. 4 is a flow chart of an example of a method 460 for network tool synchronization according to the present disclosure. As described herein, the network tool synchronization can include exporting selected information from an enterprise architecture (EA) tool (e.g., EA tool 334 as referenced in FIG. 3) to orchestration tools (e.g., orchestration tools 336-1, 336-N as referenced in FIG. 3). In some embodiments, the method 460 can be performed utilizing a system (e.g., system 102 as referenced in FIG. 1) and/or a computing device (e.g., computing device 214 as referenced in FIG. 2).

At box 462 the method 460 can include determining a data methodology of an enterprise architecture tool, wherein the data methodology is a representation of multi-tier information relating to deployment of applications. The data methodology can include a plurality of levels. In some embodiments, the levels can include a business level that includes business processes and/or business transactions, an application level that includes geographical locations of hardware, network functionality, and/or security of the system, and/or a technology level that includes information about hardware specification, serial numbers of hardware, and/or system information relating to the hardware.

In some embodiments, the data methodology can include a tree like multi-tier representation of data. For example, the business level can include a root node of the tree like representation. In this example, the application level can include child nodes off of the business level root node. In addition, according to this example, the technology level can include child nodes off of the nodes of the application level. In some embodiments the data methodology is a representation of information based on a business architecture (e.g., existing business architecture, etc.).

Determining the data methodology can include determining corresponding functionality of information within the EA tool. That is, determining the data methodology can include determining what information may be relevant for particular functions of orchestration tools. For example, determining the data methodology can include determining what information would be relevant to an orchestration tool that performs a particular transaction (e.g., business transaction, business process, etc.).

At box 464 the method 460 can include determining a functionality of an orchestration tool, wherein the functionality includes managing the applications. Determining the functionality of the orchestration tool can include determining what information is relevant to the orchestration tool. For example, the orchestration tool can utilize particular hardware and/or technology to execute applications that perform a particular business process. In this example, the information that is relevant to the orchestration tool can include information that relates to the particular hardware and/or technology, information that relates to the applications that are being executed, and/or information that relates to the particular business process.

At box 466 the method 460 can include selecting information from the enterprise architecture (EA) tool based on the functionality of the orchestration tool. Selecting information from the EA tool based on the functionality can include selecting the information from the EA tool that is determined to be relevant to the functions that a particular orchestration tool provides. That is, if an orchestration tool includes particular hardware and/or technology, information within the EA tool that relates to the particular hardware and/or technology can be selected.

At box 468 the method 460 can include exporting the selected information to the orchestration tool. Exporting the selected information can include sending a copy of the selected information to the orchestration tool. In some embodiments, the information that is received by orchestration tool can be saved into a catalog of the orchestration tool. In certain embodiments, exporting the selected information to the orchestration tool can comprise replacing existing information within a catalog of the orchestration tool with the selected information. For example, a user and/or programmer can save information into a catalog of an orchestration tool that the user and/or programmer believes is relevant (e.g., useful) information for the orchestration tool. The information that is included can be information from a particular perspective of the user and might not be complete information for a user with a different perspective and/or different needs. By replacing the existing catalog information with information from the EA tool, a more complete set of information can be included in the catalog of the orchestration tool. The information from the EA tool that is exported and saved to the catalog of the orchestration tool can include information that can be relevant for a plurality of different users.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for network tool synchronization, comprising:
a processor;
a non-transitory storage medium storing synchronization instructions executable on the processor to:
  receive a data methodology of an enterprise architecture tool from the enterprise architecture tool, the data methodology specifying at least one business function of an entity, a plurality of applications for performing the at least one business function, and a plurality of hardware components that implement the plurality of applications;
  determine, using a catalog of an orchestration tool that deploys and manages applications providing respective services of a transaction, a functionality of the orchestration tool, the catalog of the orchestration tool separate from the data methodology of the enterprise architecture tool;
  select, based on the determined functionality of the orchestration tool, information of the data methodology received from the enterprise architecture tool, the selected information relevant to applications and hardware components used by the orchestration tool to implement the functionality, and the selected information not included in the catalog of the orchestration tool; and
  export the elected information to the orchestration tool to cause update of the catalog of the orchestration tool.

2. The system of claim 1, wherein the data methodology is a tree like representation that represents relationships between features of the system, the features comprising the at least one business function, the plurality of applications, and the plurality of hardware components.

3. The system of claim 2, wherein the tree like representation includes a plurality of levels including a first level relating to transactions, a second level relating to applications, and a third level relating to hardware components.

4. The system of claim 1, wherein the catalog contains information from different users.

5. The system of claim 1, wherein the synchronization instructions are executable on the processor to cause replacement of existing information within the catalog of the orchestration tool with the exported data.

6. The system of claim 1, wherein the exporting does not export, to the orchestration tool, information of the data methodology not relevant to the functionality of the orchestration tool.

7. The system of claim 1, wherein the data methodology represents relationships among the at least one business function, the plurality of applications, and the plurality of hardware components.

8. A non-transitory computer readable medium storing instructions that upon execution cause a system to:
  receive a data methodology of an enterprise architecture tool, the data methodology specifying, for the system, a structural representation of at least one business function of an entity, a plurality of applications for performing the at least one business function, and a plurality of hardware components that implement the plurality of applications;
  determine, using a catalog of an orchestration tool that deploys and manages applications providing respective services of a transaction, a functionality of the orchestration tool, the catalog of the orchestration tool separate from the data methodology of the enterprise architecture tool;
  identify, from the enterprise architecture tool and based on the determined functionality of the orchestration tool, data of the data methodology relevant to the plurality of applications managed by the orchestration tool, and the plurality of hardware components managed by the orchestration tool, the identified data specifying information not included in the catalog of the orchestration tool; and
  export the identified data to the orchestration tool to cause update of the catalog of the orchestration tool.

9. The non-transitory computer readable medium of claim 8, wherein the instructions upon execution cause the system to receive application information from the orchestration tool, and export the received application information to the enterprise architecture tool.

10. The non-transitory computer readable medium of claim 9, wherein the application information includes geographical locations of hardware, network functionality, and security of the system.

11. The non-transitory computer readable medium of claim 9, wherein the instructions to export the received application information includes instructions to export the received application information to corresponding locations of the data methodology.

12. The non-transitory computer readable medium of claim 8, wherein the exported data replaces existing information within the catalog of the orchestration tool.

13. The non-transitory computer readable medium of claim 8, wherein the data methodology is a tree like representation that represents each business function on a first level, each application on a second level, and each hardware component on a third level.

14. The non-transitory computer readable medium of claim 8, wherein the data methodology represents relationships among the at least one business function, the plurality of applications, and the plurality of hardware components.

15. The non-transitory computer readable medium of claim 8, wherein the exporting does not export, to the orchestration tool, data of the data methodology not relevant to the functionality of the orchestration tool.

16. A method for network tool synchronization, comprising:
  receiving, by a system comprising a processor, a data methodology of an enterprise architecture tool, wherein the data methodology is a representation of multi-tier information specifying at least one business function of an entity, a plurality of applications for performing the at least one business function, and a plurality of hardware components that implement the plurality of applications;
  determining, by the system using a catalog of an orchestration tool that deploys and manages applications providing respective services of a transaction, a functionality of the orchestration tool, the catalog of the orchestration tool separate from the data methodology of the enterprise architecture tool;
  selecting, by the system using the catalog of the orchestration tool used to perform the at least one business function, information of the data methodology, the selected information relevant to applications and hardware components used by the orchestration tool to implement the functionality, and the selected information not included in the catalog of the orchestration tool; and
  exporting, by the system, the selected information to the orchestration tool to cause update of the catalog of the orchestration tool.

17. The method of claim 16, wherein the data methodology includes a representation of information based on a business architecture.

18. The method of claim 16, wherein exporting the selected information to the orchestration tool causes replacing existing information within the catalog of the orchestration tool with the selected information.

19. The method of claim 16, wherein the data methodology is a tree like representation that represents each business function on a first level, each application on a second level, and each hardware component on a third level.

20. The method of claim 16, wherein the exporting does not export, to the orchestration tool, information of the data methodology not relevant to the functionality of the orchestration tool.

21. The method of claim 16, wherein the data methodology represents relationships among the at least one business function, the plurality of applications, and the plurality of hardware components.

* * * * *